June 10, 1958  E. NORBURY  2,838,189
DEVICE FOR LIFTING BALES OR THE LIKE
Filed Oct. 4, 1956  3 Sheets-Sheet 1
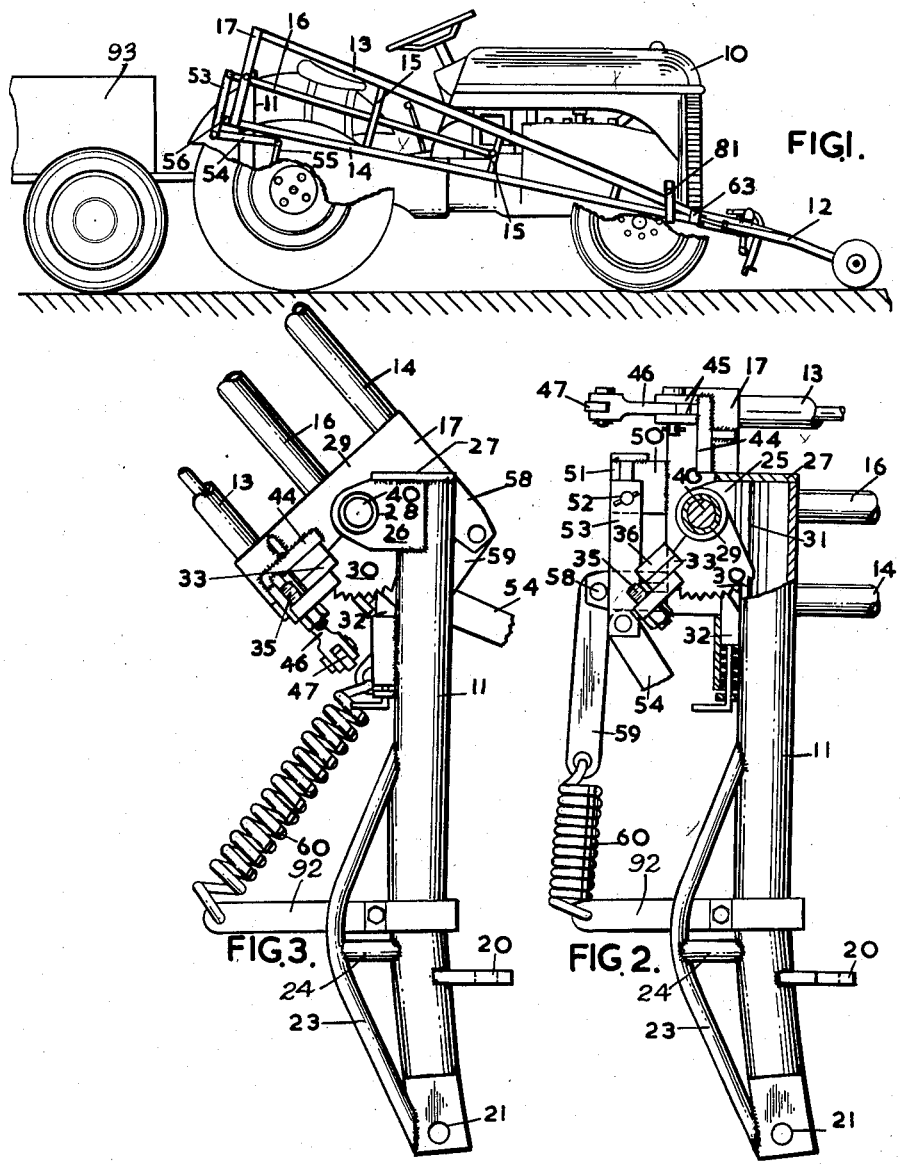

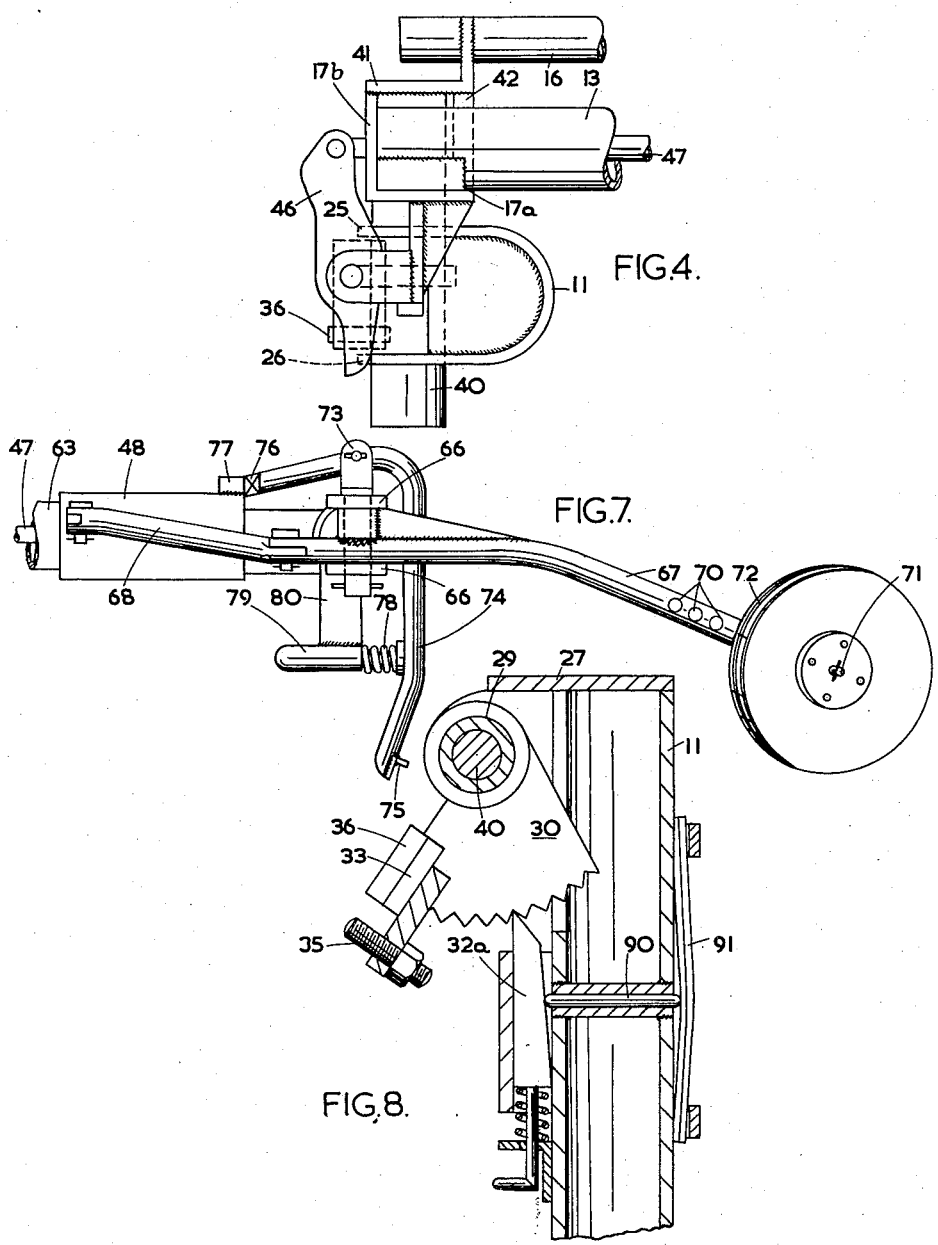

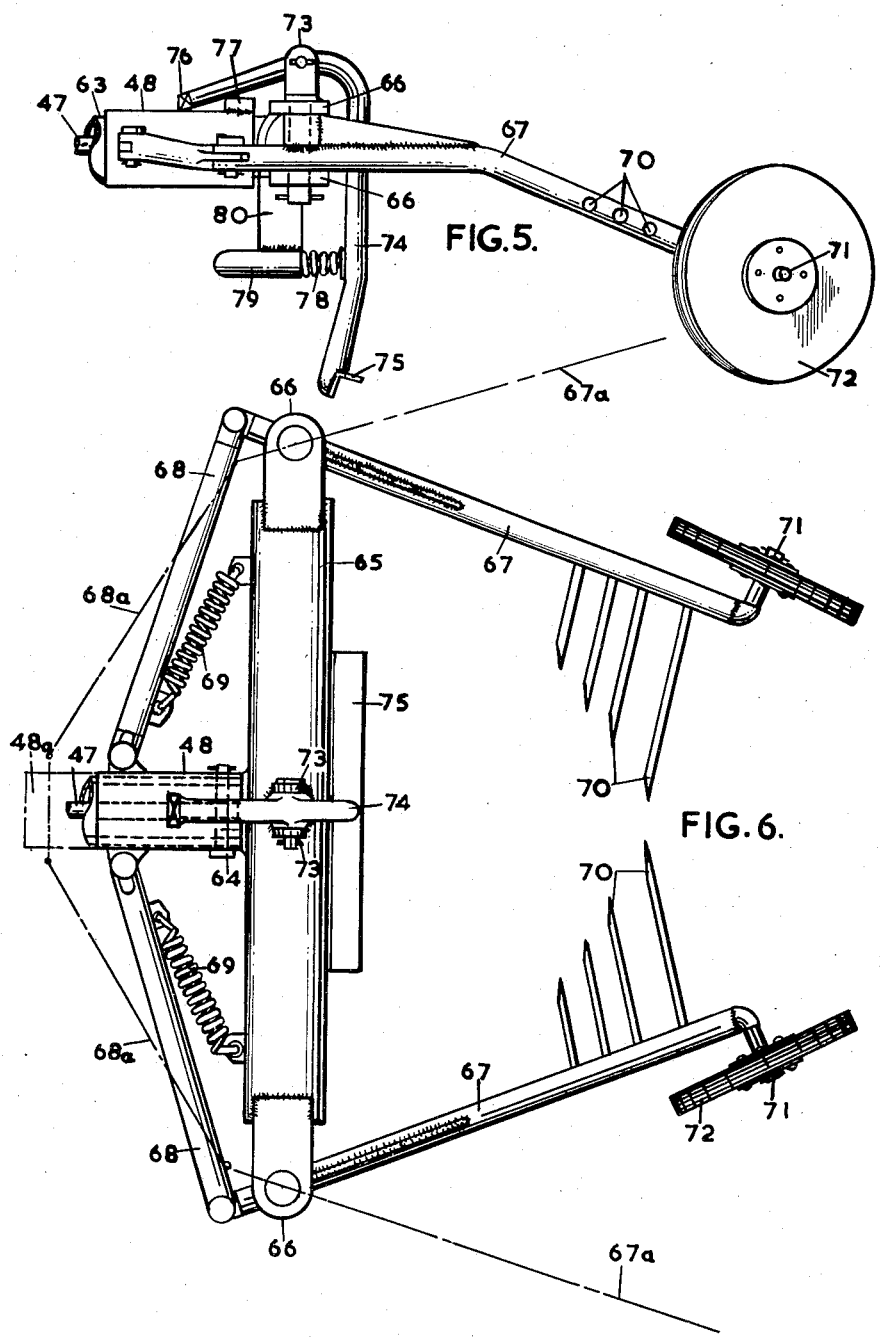

United States Patent Office 2,838,189
Patented June 10, 1958

2,838,189

DEVICE FOR LIFTING BALES OR THE LIKE

Eric Norbury, Astwood Bank, near Redditch, England

Application October 4, 1956, Serial No. 614,006

6 Claims. (Cl. 214—147)

This invention relates to a device for attachment to a tractor having a well-known and conventional lift mechanism.

A lift mechanism is a mechanism carried by most tractors and is usually operated by a drive from the engine of the tractor, either hydraulically or mechanically, so as to provide a source of lifting power for use in operating ancillary equipment.

The device is designed for picking up bales of hay or straw, or stooks formed of sheaves of corn, or the like material, when lying on the ground, and for depositing it in a trailer which is being towed behind the tractor.

Thus, by means of the invention, it is possible to load such material on to the trailer using less manpower than hitherto.

The invention is broadly characterised by a short mast on the tractor providing a pivotal support for a frame which extends beyond the front of the tractor and which carries at its free end an implement to engage the said material as the tractor moves across the ground, and by means connecting the lift mechanism with the frame so as to swing the latter and the said material through an appropriate angle in a substantially vertical plane when the lift mechanism is actuated, in order to deposit the material on to a trailer towed behind the tractor.

According to a further feature of the invention, the implement is in the form of a claw mounted on the frame, the jaws of which are biassed towards each other and are held, against the bias, in a position in which they can embrace the material to be picked up, a trip member carried by the frame engaging the material as the tractor moves towards it to release the jaws and allow them to grip the material.

In the accompanying drawings:

Figure 1 is a diagrammatic side elevation of a tractor when equipped with a device according to the invention, in which the aforesaid implement is in the form of a claw;

Figure 2 is an enlarged fragmentary detail of a mast providing a support for the frame, with the frame in a position in which it extends beyond the front of the tractor;

Figure 3 is a view corresponding to Figure 2, but showing the frame in a position in which it has been moved to a position at which the material is to be deposited on to the trailer.

Figure 4 is a plan view of Figure 2, to a larger scale;

Figure 5 is a side elevation of the forward end of the device, with the jaws in a closed position;

Figure 6 is a plan view of Figure 5;

Figure 7 is a side elevation, corresponding to Figure 5, but with the jaws in an open position; and Figure 8 is a section through the top of the mast, and shows a modification thereof.

As will be seen from Figure 1, the tractor, indicated at 10, has mounted at the rear thereof a short mast 11 which supports a frame carrying an implement 12.

The frame is formed by an upper tubular longitudinal 13, and a lower tubular longitudinal 14 held in spaced relationship by struts 15, a further longitudinal 16 being provided for bracing the frame. At their forward ends the longitudinals 13, 14 merge into a single tube for a purpose later described, and at their rear ends are secured to a member 17 by which they are pivotally mounted on the mast 11.

Referring now to Figures 1 to 4, the mast 11 has a bracket 20 and a lateral pin 21 by which it can be quickly attached to or detached from complementary brackets provided on the tractor. For reinforcing the mast, tubes 23, 24 are welded to it.

At its upper end the mast has welded to it ears 25, 26, and a closure plate 27, the ears having aligned holes 28 in which a tubular shaft 29 carrying a peripherally serrated quadrant 30 is journalled. The quadrant 30 can enter a slot 31 formed in the top of the mast, and is held in an adjusted position by a spring-pressed pawl 32 carried by the mast, the quadrant having a bracket 33 secured to it which supports an adjustable abutment 35 and a block of shock absorbent material 36 (for example, of natural or synthetic rubber).

The member 17 is of L shape in plan, having two limbs 17a, 17b, and has extending traversely thereof a substantial stub-shaft 40, the shaft being welded into an aperture in one limb 17a (Figure 4), and to a bracket 41 which additionally serves as a support for the adjacent end of the longitudinal 16. A gusset 42 is provided between the limb 17a and the bracket 41. The shaft 40 is received, and secured in the tubular shaft 29, and forms the pivot on which the frame turns.

The member 17 also carries a bracket 44 which engages the block 36 when the frame is sufficiently turned, and, pivoted in ears 45 on the bracket is a lever 46, one end of which engages the abutment 35 when the frame is sufficiently turned, and the other end of which is connected by a link 47, within the longitudinal 13, to a sleeve 48 (Figure 6) for a purpose later described.

A bracket 50 secured to the other limb 17b of the member 17 has a slot 51 in which a pin 52, fast with a link 53, is slidable, the link being connected through a link 54 to the driven arm 55 of the lift mechanism of the tractor. A stop 56 on the member 17 forms a reaction member for the link 53, so that the turning moment applied to the frame is initially at the stop 56, and then at the pin 52. This is necessary because the frame must move through a greater angle than can be catered for by the lift mechanism. The member 17 also carries a bracket 58 on which a link 59, connected to a spring 60, is pivoted. The spring 60 is anchored to a member 92 clamped to the mast 11.

Referring now to Figures 1 and 5 to 7, the longitudinals 13, 14 merge into a cylindrical portion 63, on which the sleeve 48 is slidably mounted, and the portion 63 is slotted for a pin 64, fast with the sleeve 48 and passing through the link 47, to pass through it. The portion 63 is secured to a member 65 extending traversely of the frame and parallel to the shaft 40, the member 65 having at its ends ears 66 in which are pivoted jaws 67 of the claw.

At their ends adjacent the frame, the jaws are connected by links 68 to the sleeve 48, and tension springs 69 are connected to the links 68 and member 65 to bias the jaws to the position shown in Figure 6. At their other ends, the jaws carry projections 70 and stub axles 71 on which are journalled discs 72 formed, for example, of rubber-bonded laminated fabric.

The member 65 carries ears 73, between which is pivoted a trip member 74 having at its lower end a bar 75 for engaging the material to be picked up, the member 74 having at its other end a detent 76 which can coact with an abutment 77 on the sleeve. The member 74 is biassed by a spring 78, carried in a thimble 79 supported by a bracket 80 from the member 65, for its detent to engage behind the abutment 77.

A U-shaped bracket 81 is provided at the front end of the tractor for supporting the frame in a lateral direction.

In use, the mast 11 is attached to the tractor and the link 54 connected to the arm 55 of the lift mechanism. The aforesaid one end of the lever 46 is then moved to move the sleeve 48 to the position shown in chain dotted lines 48a in Figure 6. As the sleeve 48 moves, the detent 76 rides up and over the abutment 77 and the spring 78 moves it to lie behind the abutment (as shown in Figure 7) and prevents reverse movement of the sleeve. At the same time, the arms 67 and links 78 are moved, against the bias of the springs 69, to the positions indicated by the chain lines 67a, 68a, in which position the jaws can embrace the material to be picked up. The quadrant 30 is then adjusted to determine the height above the trailer at which the material is to be released.

The operator then drives the tractor towards the material, which enters the jaws and then moves the trip lever against its bias to release the detent 76 from the abutment 77. The jaws are then free to close under their bias, and the material is impaled on the projections 70 to prevent it slipping out of the claw. The operator then actuates the lift mechanism to turn the frame about its pivot and raise the load.

As the load passes over the pivot 40 of the frame, the lift mechanism ceases to become effective, and the movement on the frame is partially absorbed by the spring 60. The load continues to fall rearwardly, and eventually the said one end of the lever 46 engages the stop 35 (as shown in Figure 3) to withdraw the sleeve 48 for opening the jaws to release the material on to a trailer 93 attached to the tractor 10. The movement of the frame causes it to move still further rearwardly until the bracket 44 engages the block 36, the lever 46 continuing the rearward movement of the sleeve 48 during this movement to allow the detent 76 to reposition itself behind the abutment 77. The spring 60 then becomes effective, and moves the frame over its pivot again, the frame then descending by gravity against resistance offered by the lift mechanism, if the lift mechanism is of the well-known hydraulic type. The device is then in a condition in which it can pick up a further collection of material.

The above operation can be carried out while the tractor is in motion, thus reducing time lost in loading.

The discs 72 are provided to prevent the forward ends of the jaws 67 from digging into excrescences of the ground which they may encounter. The disc normally set as wheels, but, when they encounter an excrescence which is too steep for them to negotiate, they buckle and act as skids. Obviously, the operator would actuate the lift mechanism to raise the frame if a large obstacle lay in its path.

Should the operator incorrectly adjust the stop 35 to a great extent in one direction, there is a possibility that the jaws 67 and links 68 may be moved by the lever 46 to a position in which their respective pivots are in a straight line. Any continued movement thereafter would result in a severe shock or impact being delivered to the pivots of the claw with possible consequential damage. To mitigate this disadvantage the spring-pressed pawl 32 can be replaced by one having a longitudinal taper, as shown at 32a in Figure 8, the pawl 32a abutting one end of a rod 90 the other of which abuts a laminated leaf spring 91 mounted on the mast 11. In this way the quadrant is allowed a limited angular movement against the bias of the spring 91, which acts as a shock absorber.

Obviously, the frame may carry an implement, for example, a fork or pallet, in place of the above-described claw.

What I claim as my invention and desire to secure by Letters Patent of the United States is:

1. In a tractor incorporating a lift mechanism, a device for picking up bales of hay or straw, or stooks formed of sheaves of corn, or like material, the device comprising a frame and a short mast on the tractor, the mast providing a pivotal support for the frame, the frame extending beyond the front of the tractor and carrying forwardly an implement to engage the said material as the tractor moves across the ground, means connecting the lift mechanism to the frame so as to swing the frame and said material through an appropriate angle in a substantially vertical plane when the lift mechanism is actuated, in order to deposit the material on to a trailer, the implement being in the form of a claw mounted on the frame, the claw having jaws which are biassed towards each other and are held against the bias in a position in which they can embrace the material to be picked up, a trip member carried by the frame engaging the material as the tractor moves towards it to release the jaws and allow them to grip the material, the jaws being pivoted, intermediate their lengths, from a member fast with the frame, a sleeve slidably supported on the frame, links, the ends of the jaws adjacent the frame being connected by the links to the sleeve, the sleeve carrying an abutment for coaction with a detent of the trip member, the bias being provided by springs one end of each spring being fast with the member fast with the frame, and the other end of each spring being fast with a respective link adjacent the connection of each link to the sleeve.

2. A device, according to claim 1, and in which the jaws carry projections which, under the influence of the bias on the jaws when they are released, enter into the material to prevent it slipping out of the claw.

3. A device, according to claim 2 and comprising a lever connected to the sleeve so that the sleeve can be slid by the lever, for opening the jaws to release the material and for moving the jaws to a position in which they are held against their bias, an abutment, the lever coacting with the abutment when the frame is moved through the appropriate angle, a quadrant journalled coaxially with the the pivotal axis of the frame, the abutment being supported by the quadrant, the quadrant being angularly adjustable about said axis, whereby the position of the frame at which the material is released from the jaws is adjustable.

4. In a tractor, the combination of a lift mechanism incorporated in the tractor and a device for picking up bales of hay or straw, or stooks formed of sheaves of corn, or like material, the device comprising a short mast supported by the tractor, a frame and an implement, the mast providing a pivotal support for the frame, the frame extending beyond the front of the tractor, the implement being attached to the end of the frame remote from the tractor so as to engage the said material as the tractor moves across the ground, and being in the form of a claw mounted on the frame, the claw having jaws, means biassing the jaws towards each other, and means holding the jaws against the bias in a position in which they can embrace the material to be picked up, a trip member carried by the frame and positioned to engage the material as the tractor moves towards the material to release the jaws and allow the jaws to grip the material, the device also comprising means connecting the lift mechanism with the frame so as to swing the latter and said material through an appropriate angle in a substantially vertical plane when the lift mechanism is actuated, in order to deposit the material on to a trailer.

5. A device according to claim 4, and comprising a member fast with the frame, the jaws being pivoted intermediate their ends on the member, a sleeve slidably carried on the frame, links connecting the end of the jaws adjacent the frame to the sleeve, the sleeve carrying an abutment for coaction with the trip member.

6. A device according to claim 4 in which the implement includes, at its end remote from the frame, ground-engaging discs of a flexible material, the discs in normal conditions acting as wheels for guiding the implement over the ground, and, when encountering an obstacle over which they cannot freely run, buckling to act as skids.

References Cited in the file of this patent

UNITED STATES PATENTS

| | | |
|---|---|---|
| 2,287,375 | Ford | June 23, 1942 |
| 2,634,003 | Williamson et al. | Apr. 7, 1953 |
| 2,714,011 | Albee | July 26, 1955 |